United States Patent [19]
Hadeishi

[11] B 3,914,054
[45] Oct. 21, 1975

[54] ZEEMAN EFFECT ABSORPTION SPECTROMETER

[75] Inventor: Tetsuo Hadeishi, Berkley, Calif.

[73] Assignee: The United States of America as represented by the United States Energy Research and Development Administration, Washington, D.C.

[22] Filed: Feb. 13, 1974

[21] Appl. No.: 442,280

[44] Published under the Trial Voluntary Protest Program on January 28, 1975 as document no. B 442,280.

Related U.S. Application Data

[63] Continuation of Ser. No. 288,801, Sept. 13, 1972, abandoned.

[52] U.S. Cl. ................. 356/51; 250/573; 250/575; 356/85; 356/87; 356/88
[51] Int. Cl.² ..................... G01N 21/34; G01J 3/30
[58] Field of Search ............. 356/51, 85, 86, 87, 88, 356/96; 250/573, 575

[56] References Cited
UNITED STATES PATENTS

| | | | |
|---|---|---|---|
| 3,449,565 | 6/1969 | Barringer | 356/51 |
| 3,544,789 | 12/1970 | Wieder | 356/87 |
| 3,676,004 | 7/1972 | Prugger et al. | 356/87 |

OTHER PUBLICATIONS
"Hyperfine Zeeman . . . Mercury;" Hadeishi et al.; Science; Vol. 174; 22 Oct. 1971; pp. 404–407.

*Primary Examiner*—Vincent P. McGraw
*Attorney, Agent, or Firm*—John A. Horan; Leonard Belkin; Cornell D. Cornish

[57] ABSTRACT

Apparatus and method that employs Zeeman reference and absorption components in a spectrometer for rapidly and accurately detecting the presence of trace amounts of a specific biologically dangerous metal element, such as Hg, that contaminates a host substance, such as food. In one embodiment for detecting Hg in fish, the method comprises heating a sample of fish containing mercury to form a vapor, transmitting a focused light spectra from a specific mercury isotope light source in a magnetic field at right angles to the light spectra, said spectra containing 2,547 A light and specific Zeeman components, comprising a component that is attenuated by the mercury in the vapor an amount corresponding to the amount of mercury in the sample and at least one reference component that is substantially unattenuated by the Hg in the vapor, filtering the transmitted focused spectra with a 2,537 A filter, splitting the filtered spectra into two beams whose intensities correspond respectively to the intensities of the attenuated and reference components, and detecting and difference of said beams as a measure of the mercury in the fish.

10 Claims, 4 Drawing Figures

ZEEMAN EFFECT ABSORPTION SPECTROMETER

CROSS-REFERENCE TO RELATED APPLICATIONS

This application is a continuation of application Ser. No. 288,801, filed Sept. 13, 1972, now abandoned, and is related to co-pending application Ser. No. 336,579, filed Feb. 28, 1973.

BACKGROUND OF THE INVENTION

This invention was made in the course of, or under a contract with the U.S. Atomic Energy Commission. Also supported by RANN section of NSF for the preparation of this application.

In the environmental field it is desirable to detect and measure the presence of specific biologically dangerous metal contaminants, such as mercury, in a variety of substances, such as raw fish, vegetables, meats etc. Various means and methods have been proposed or used heretofore. For example, the mercury has been quantatively separated chemically from the food and/or qualitatively identified by standard chemical processes. However, these processes have been expensive and time consuming, or otherwise inadequate. It would be especially advantageous to provide a quick, inexpensive, sensitive and accurate system for detecting mercury and/or other elements in food, and/or other substances. In particular, it is desirable to provide rapid analysis of mercury in fish, such as tuna fish and swordfish, to about 0.1 ppm in less than 1 min. (e.g., a few seconds) without first separating the mercury from the host material.

SUMMARY OF THE INVENTION

This invention provides apparatus and method for detecting the levels of biologically dangerous contaminants, such as mercury in host substances, such as fish, vegetables, meats, etc., by using a Zeeman effect absorption spectrometer. More particularly, it has been discovered in accordance with this invention that a rapidly vaporized sample of the host containing the contaminant causes equal scattering of specific Zeeman components that are differentially absorbed by the contaminant to produce a reference component and an attenuated component whose attenuation corresponds with the amount of the contaminant in the sample. In one embodiment, this invention provides a method and apparatus for producing and continuously detecting this differential absorption for achieving the desired resultts. In another aspect, a single specific light source provides the desired Zeeman components so that light fluctuations of all the components of lines are identical and sharp, for determining mercury in the sample, whereby the detection error, due to temperature fluctuation of the light source, is negligible. With the proper selection of components, as described in more detail hereinafter, the desired atomic absorption spectrometer and method are achieved.

Briefly described the method of this invention involves, in one embodiment, measuring the presence of mercury in a host material, comprising the steps of heating a sample of the host material to form a vapor, producing specific light spectra from a $^{199}$Hg light source in a 10 kG magnetic field, the spectra including light having wavelength $\lambda = 2,537$ A and specific group of Zeeman components denoted by $\sigma^+$, $\sigma^-$ and $\pi$ that are equally scattered by the vapor but differentially absorbed by the Hg in the vapor, said $\sigma^+$ and $\sigma^-$ components forming a substantially non-absorbed reference and said components being on top of the mercury absorption peak profile in the vapor, transmitting a focused beam of said light spectra through the vapor including the mercury in said sample to attenuate the components by Hg absorption while leaving said $\sigma^+$ and $\sigma^+$ components substantially unabsorbed by said mercury, and splitting the 2,537 A light passed through the first filter into equal beams containing all three of the components for using the $\sigma^+$ and $\sigma^-$ components as a reference for monitoring the absorption of the $\pi$ components as a measure of the contaminant in the vapor. For the sake of simplicity, we denote the group of Zeeman components shifted away from the absorption peak in higher frequency side by $\sigma^+$ and those shifted in lower frequency by $\sigma^-$ and those that stay at the absorption peek or vicinity by $\pi$. To this end, a specific apparatus is provided that filters the $\pi$ components from one of the beams and continuously produces signal outputs corresponding to the intensity of the filtered and unfiltered beams, the difference between the signals being a measure of the amount of mercury present in the host material. Initial adjustment is made by providing for cancellation of the signals when a host material not containing mercury is employed. Thus, changing host materials containing mercury will produce unbalanced signals.

It is thus a principle object of this invention to provide an inexpensive and sensitive method and apparatus for rapidly and accurately detecting without prior chemical separation, mercury in food and/or other substances, by the use of beams of specific Zeeman components.

The above and further novel features and objects of this invention will become apparent from the following description of one embodiment when read in connection with the accompanying drawings, and the novel features will be particularly pointed out in the appended claims.

BRIEF DESCRIPTION OF THE DRAWINGS

In the drawings, where like elements are referenced alike.

DESCRIPTION OF THE PREFERRED EMBODIMENT

This invention is useful in detecting mercury levels in food substances, such as raw fish, vegetables, meats, etc. However, as will be understood in more detail from the following, this invention is useful in a wide variety of other applications requiring the detection of mercury levels in a sample. Thus, this invention is useful in a wide variety of environmental and other applications requiring such mercury determinations. Additionally, principles of this invention are useful in detecting other elements in various substances, as understood by one skilled in the art in more detail from the following. Examples of such other contaminates are arsenic, lead and cadmium.

In understanding this invention, it will be helpful to trace the background thereof. In this regard, mercury optical-pumping nuclear magnetic resonance magnetometers are known in the art of measuring magnetic fields for scientific or practical purposes, such as in oil prospecting. One such magnetometer is described in Ann. Phys. 6, 467 (1961), and the principles thereof are employed in connection with the discovery of this invention that such magnetometers can be modified for use in determining the levels of Hg in fish or other substances. To this end, the magnetometer employed and adapted and modified in accordance with this invention, is able routinely to observe a magnetic resonance signal having an equivalent density of about $10^{10}$ to $10^{11}$ atoms per $cm^3$. This corresponds to about $10^{-12}$ g of mercury per $cm^3$. Because of the intrinsic sensitivity of this apparatus and because considerable work has been done to construct a stable, intense, sharp mercury lamp and associated electronics, converting this magnetometer to a mercury detector is not only of interest but, as it has been successful, is a significant advance in the art of measuring and detecting mercury in fish or other host substances. Moreover, completely inexperienced personnel and non-technically trained fishermen can use the apparatus and method of this invention with an accuracy in mercury detection to at least 0.04 ppm (40 ppb). Additionally the detection system of this invention operates inexpensively and rapidly in less than 1 minute (down to only a few seconds) to detect Hg without prior chemical separation thereof from a host material. Furthermore, the present invention makes it possible to provide a light weight magnet for commercial use.

Figure 1:
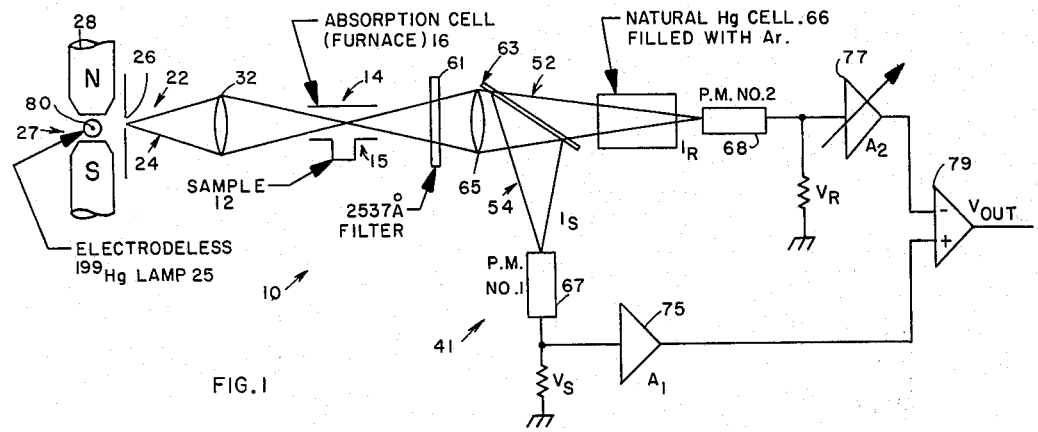
FIG. 1 is a partial schematic view of the apparatus of this invention, which illustrates the principles for performing the novel method of this invention.

Referring to FIG. 1, in one preferred embodiment of the apparatus 10 of this invention, a sample 12, comprising a host 14 containing the contaminant to be detected, is rapidly heated to a vapor 15 in a furnace 16, and a light spectra containing specific Zeeman components are transmitted through the vapor 15. To this end, light spectra 22 in a light beam 24 transmitted from a suitable lamp 25 through a hole 26 in a direction normal to the magnetic field 27 produced by magnet 28, provides the desired spectra containing the required Zeeman components. Thereupon, lens 32 focusses the spectra to pass through the vapor 15, wherein the specific Zeeman components are equally scattered and differentially absorbed by the contaminant in the vapor. Thus, the components can be collected and separated for analysis in a suitable detector 41.

In this regard, the transmitted spectra 22 contain a group of Zeeman components that forms a reference for comparison with a remaining components whose intensity attenuation corresponds to the amount of the contaminant in the sample 12.

Should a specific mercury isotope lamp be used in a magnetic field for providing a focused light spectra 22 containing 2,537A light and Zeeman components forming differentially absorbed reference and monitor components, the light spectra can be transmitted through the vapor 15, the 2,537A light can be removed from the transmitted spectra 22, and the remaining transmitted spectra can be split into two beams for removal of the remaining attenuated component from one of the beams, whereby the difference of intensities of the two beams can be detected and averaged or otherwise analyzed as a measure of the Hg contaminant in the vapor. For example, a simple filter can remove the attenuated component from one of the beams easily, simply, inexpensively and accurately to detect the beam intensities as a measure of the amount of the Hg contaminant in the vapor, and thus the sample before its vaporization. To this end, in one embodiment of the apparatus of this invention, the transmitted spectra 22 are split into one beam 52 containing the reference component, and one beam 54 containing the reference component plus the attenuated component remaining after absorption by the Hg in the vapor 15. Then the beams are detected and analyzed in a detector 41, which produces an output voltage $V_{out}$ thereby to measure the amount of the contaminant in the sample.

Figure 2:
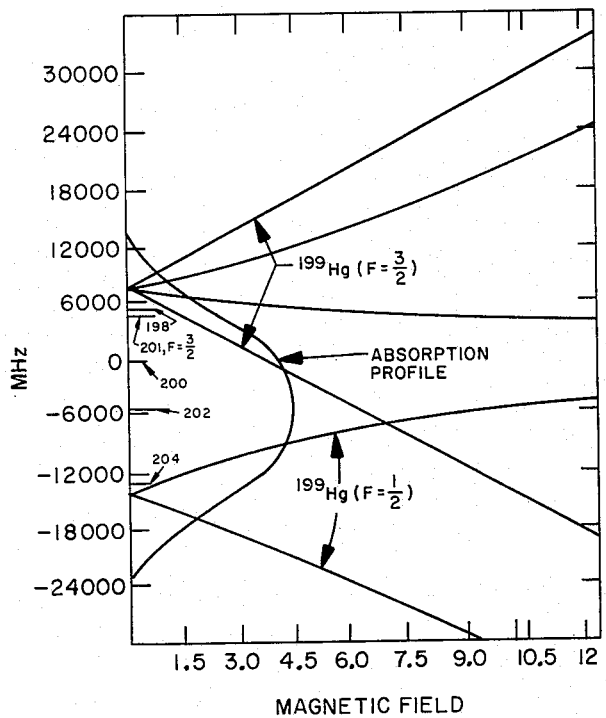
FIG. 2 is a graphic illustration of the energy levels of the $6^3P_1$ states of natural mercury isotopes and the Zeeman pattern of the $^{199}$Hg in $^3P_1$ states with hyperfine structure F=3/2 and F=1/2 at the extreme ends of the natural mercury isotope distribution. The pressure-broadened profile of the $6^3P_1$ state of natural Hg in zero magnetic field is superimposed on the figure.

In operation for detecting a Hg contaminant in sample 12, consider the light spectra from a $^{199}$Hg lamp 25, which transmits ultra violet light at a wavelength of 2,537 A in beam 24. Due to the magnetic field 27, the transmitted light spectra contain specific Zeeman components. For example, the magnetic field 27 produces specific Zeeman components, comprising a group of Zeeman components on top of the peak of the absorption profile of the Hg ultra violet light spectra, and remaining components on the side of this absorption profile away from the peak thereof. For ease of explanation, the group of components of this specific $^{199}$Hg lamp 25 is referred to as the $\pi$ components, and the second components are referred to as $\sigma^+$ and $\sigma^-$ components. A theoretical discussion of the principles of these specific components is given in University of California Lawrence Berkeley Laboratory Report UCRL—20643, which was published in Science in October, 1971. FIG. 2 shows the Zeeman effect of $^{199}$Hg and the energy levels of the natural mercury isotopes, as is understood in accordance with principles of this invention.

In the embodiment of FIG. 1, the detector simultaneously continuously detects the transmitted light spectra in the split beams.

In another aspect of the method of this invention, the process alternately periodically detects the transmitted light spectra in beams containing a respective reference and monitoring component.

The following examples illustrate this invention:

EXAMPLE I

A sample of tuna fish was placed in the furnace at room temperature. The furnace quickly heated the sample to 800°C in a few seconds so that recordings of $V_{out}$ could be taken while the furnace temperature rose rapidly. By the time the furnace reached 800°C, the tuna fish vaporized to a vapor for determining the Hg concentration in the tuna fish.

The lamp, which was an electrodeless lamp at 300K containing a $^{199}$Hg source of 2,537 A wavelength light, was immersed in a 10 kG magnetic field produced by a dipole magnet having north and south poles spaced apart by about 11 mm for transmitting the desired spectra at right angles to the field through a 2.5 mm diameter aperture.

The resonance radiation of the 2,537 A wavelength light corresponding to the $^3P_1 \longrightarrow{} ^1S_0$ transition, split into roughly speaking 3 Zeeman components, one group being on the top of absorption profile of Hg ($\pi$) and the other two on the wing of the absorption profile ($\sigma^+$ and $\sigma^-$). and second specific Zeeman components at specific frequencies that were equally scattered and differentially absorbed by the Hg in the vapor — the $\sigma^+$ and $\sigma^-$ components lying outside the absorption profile of the Hg in the vapor to form a reference, and the $\pi$ components lying inside the Hg light absorption profile, i.e., on top of the absorption peak profile, to form a monitor. The shape and peak of this light absorption profile were checked by conventional means, comprising a Fabry-Perot interferometer and by Bitter's magneto-optical scanning method, as described in the above-mentioned Report UCRL–20643.

A first filter passed the 2,537 A light from the focused spectra transmitted through the vapor, a beam splitter split the spectra into two equal beams containing the transmitted components, comprising the attenuated $\pi$ components and the $\sigma^+$ and $\sigma^-$ non-absorbed reference components, a second filter containing natural mercury in argon at 25°C removed the $\pi$ components from one of the beams, and the two beams remaining were received by conventional photomultipliers that produced amplified signal outputs, each respectively corresponding to the intensity of the beam received thereby. The difference of two signal output amplitudes were averaged and combined by integrating them in a suitable amplifier to produce an average $V_{out}$ corresponding to the Hg in the vapor, and thus corresponding to the amount of the Hg in the sample since the attenuation of the $\pi$ components in the vapor corresponded to the amount of the Hg in the vapor.

Initially, the photomultiplier outputs were balanced to produce equal outputs that cancelled each other and gave a predetermined zero V out signal when no vapor was present in the furnace. To this end, the intensity of the light from the lamp was adjusted, and/or the gain of one or more of the photomultipliers or the amplifiers used in connection therewith was adjusted. However, these balanced signals became unbalanced an amount corresponding to the amount of the mercury in the sample and its vapor when the vapor was introduced into the furnace. Thus, it was found that the light spectra from the lamp that was focused to pass through the vapor, could be detected and analyzed for the component that was attenuated an amount corresponding to the Hg in the vapor, and the photomultipliers produced an unbalanced $V_{out}$ signal corresponding to this attenuation.

EXAMPLE II

The same apparatus conditions, steps and sequence of the above-mentioned Example I were repeated with another sample that was heated in the furnace to produce a vapor for the transmitted light spectra from the lamp containing the $^{199}$Hg source of light at 2,537 A. The sample, comprised HgO mixed with C in 1.2 ppm and like results were obtained.

EXAMPLE III

Example I was repeated using mercury samples in the form of HgO and methyl mercuric chloride ($CH_3Hg$ Cl), whereby the decomposition of the HgO started at 500°C, and that of the $CH_3Hg$ Cl at 170°C. The pattern of the absorption curves were like those illustrated in FIG. 3.

EXAMPLE IV

Example I was repeated using a furnace formed from a helix having a nichrome heating element. A gas was flowed therethrough, comprising $O_2$ in an inert gas, such as nitrogen. The gas flow reduced the smoke in the furnace below a level that produced 100 percent attenuation of the transmitted light spectra.

EXAMPLE V

Example IV was repeated at various temperatures from about 500° to about 900°C and above, and it was found that sensitivities improved by decreasing smoke as the furnace temperatures were increased.

EXAMPLE VI

Specific light spectra, comprising 2,537 A light and $\sigma^+$ and $\sigma^-$ for detecting Hg in a fish sample were produced by an electrodeless $^{198}$Hg lamp immersed in a 7 kG field, at which field strength the $\sigma^+$ and $\sigma^-$ Zeeman components were 0.5 wave number apart. The $\sigma^-$ Zeeman component was centered on the top of the absorption peak profile of the Hg so as to provide an attenuated Hg monitor component whose attenuation corresponded to the amount of the Hg contaminant in the heated vapor. The $\sigma^+$ component was on the side of the absorption peak profile so as to provide a reference unattenuated component. The light spectra containing the $\sigma^+$ and $\sigma^-$ components from the $^{198}$Hg lamp was focused and transmitted through a rapidly vaporized sample of the fish at 900°C. The transmitted light spectra were focused into a beam that was singly filtered once only by a 2,537 A filter and split into two respective beams, one respectively containing the $\sigma^-$ attenuated component, and the other beam respectively containing the unattenuated $\sigma^+$ reference component. Then the beams were detected and converted into signals by a photomultiplier system for producing electrical signals whose amplitudes corresponded to the intensity of the beams, whereby the average of the signals corresponded to the amount of the Hg in the vapor. To this end, the beams were alternately periodically detected and integrated to produce a $V_{out}$ signal. The results provided by the $V_{out}$ signal satisfactorily detected the Hg contaminant in the vapor in a few seconds down to the parts per billion range without using any natural Hg filtering of either of the split beams.

EXAMPLE VII

Example VI was repeated with a stainless steel furnace formed as the secondary of a transformer for rapidly heating the vapor to 900°C and above. It was found that increasing the furnace temperature to temperatures of about 900°C or more increased the sensitivity of the Zeeman absorption spectrometer system employed therewith in accordance with the method of this invention, and that the use of the furnace as the secondary of the transformer increased the life of the furnace when operated less than 100 percent duty cycle.

In the operation of the apparatus of FIG. 1, the 2,537 filter 61, in accordance with this invention, whereby a beam splitter 63 can split the spectra remaining into beams 52 and 54 for analysis of the described Zeeman components as a measure of the Hg in sample 12.

In this regard, it has been discovered in accordance with this invention that the absorption or scattering by the nonmercury vapors 15 in furnace 16 in general varies very slowly in the vicinity of 2,537 A, so the amount of absorption or scattering by nonmercury vapor is the same or nearly equal for the $\sigma^+$ and $\sigma^-$ components in accordance with this invention, as indicated by their lines in a conventional spectrometer. Thus, by constructing a detector 41 having a beam splitter 63 that splits the transmitted spectra into beams 52 and 54 respectively containing the total monitoring light, e.g., $I_S = (\sigma^+) + I(\sigma^-) + I(\pi)$, and the reference light, e.g., $I_R = I(\sigma^+) + I(\sigma^-)$, wherein the $\sigma^+$ and $\sigma^-$ components are referred to as the reference components, this invention obtains the effect of absorption by mercury only, provided the absorption by nonmercury vapor is not close to 100 percent.

In one detector 41, the transmitted light spectra 22 from furnace 16 after absorption by mercury vapors 15 from the heated sample 12 is filetered by a 2,537 A filetered 61 and then subject to focussing once again by a lens 65. Then this transmitted light is split by beam splitter 63 for detection of the reference and monitoring components in detector 41. To this end, in one embodiment half the light in the beam 24 from lens 65 passes through light splitter 63 and natural Hg vapor cell 66 filled with Ar to form a light signal $I_S$, which is received by photomultiplier number 68. Thereupon, the respective photomultipliers 67 and 68 produce output signals $V_R$ and $V_S$, and amplifiers $A_1$ and $A_2$, which are designated by reference numbers 75 and 77, takes difference of these signals in amplifier 79, which averages the amplitudes of the signals to produce an output $V_{out}$.

Because of the mercury cell 66 (Hg at 25°C in 1 atmosphere of Ar or $N_2$) in front of the photodetector 68 which removes the $\pi$ component, the intensity of the light $I_R$ impinging on this detector is entirely due to the $\sigma^+$ and $\sigma^+$ components, which are denoted as $$I_R = I(\sigma^+) + I(\sigma^-) = I_{out},$$

whereas the intensity of the light $I_S$ impinging on the photodetector 67 contains all these components, given by $$I_S = I(\sigma^+) + I(\sigma^-) + I(\pi) = I_{out} + I_{in}.$$

Here S stands for the intensity of the light containing the signal due to mercury and R stands for the nonmercury reference; $I_{out}$ for the intensity of the Zeeman components lying outside the absorption profile and $I_{in}$ for those lying within. The photoelectric current, and hence the output voltages of photomultipliers 67 and 68, is proportional to $I_S$ and $I_R$. Thus, the output voltages can be represented by $V_S = k_1 I_S$ and $V_R = k_2 I_R$, where $k_1$ and $k_2$ account for the quantum efficiency of the photodetectors, the gain, the geometrical factor, etc. In the absence of a sample containing mercury in the absorption cell, the operator sets $V_{out} = V°_{out} = V_S - V_R = 0$, either by adjusting the light intensity of $I_S$ and $I_R$, or by means of the amplifier gains $A_1$ and $A_2$.

In the actual practice of detectingg mercury in the host material, it is not convenient to use the normal Zeeman effect of a natural Hg lamp 25, since the width of the absorption profile is so large, because of pressure broadening, that large magnetic fields limit getting Zeeman components out sufficiently far away from the absorption profile (more than 20 kG). This would add the cost and weight of a relatively large magnet to the instrument. To overcome this difficulty, lamp 25 is a $^{199}$Hg source 80, since the hyperfine structures of $^{199}$Hg in the $^3P_1$ state lie at the two extreme ends of the isotope distribution of natural mercury. A $^{198}$Hg source 80 is also advantageous to this end.

FIG. 2 shows the Zeeman effect of $^{199}$Hg along with the energy levels of the natural mercury isotopes. From FIG. 2 a gain is evident of about 12 GHz in Zeeman separation over the normal Zeeman effect discussed previously [$^{199}\Delta\gamma$ ($^3P_1$) = 22,128.650 MHz]. However, the pressure broadened profile of natural Hg (about 10% $^{198}$Hg, 28% $^{200}$Hg, 13% $^{201}$Hg, and 20% $^{202}$Hg) overlaps these two hyperfine levels in a zero magnetic field. So a further shift in the hyperfine lines is selectively provided by the Zeeman effect in accordance with this invention.

About a 10 kG magnetic field can shift the hyperfine Zeeman levels $F = 3/2$, $m_F = 3/2>$, $F = 3/2$, $m_F = ½>$, and $F = ½$, $m_F = -½>$ of $^{199}$Hg sufficiently far away that the optical Zeeman component originating from these three levels can be used as $I_{out}$, described earlier. The remaining Zeeman lines originating from $F = 3/2$, $m_F = -½>$, $F = 3/2$, $m_F = -3/2>$, and $F = m_F = ½>$ play the role of $I_{in}$. Thus, this embodiment of this invention uses a light weight permanent magnet 28 and still obtains sufficient shifts in the hfs Zeeman lines to obtain an $I_{out}$ reference signal for elimination of the nonmercury effect.

Figure 3:
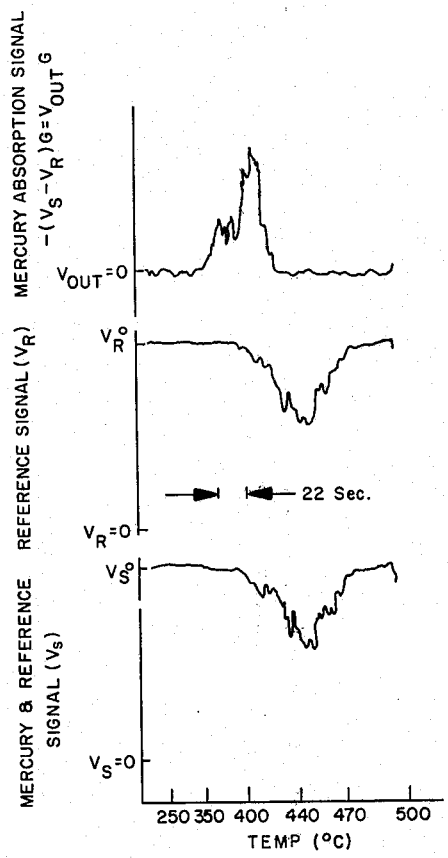
FIG. 3 shows graphic illustrations of recorder tracings of $V_s$, $V_R$ and amplified Hg signal $-G\,XV_{out}$ for tuna meat, where $-G$ is the gain of the amplifier with integration time constant of 0.1 sec. The large drop in $V_S$ and $V_R$ is due to the smoke effect. The temperature indicated is the temperature of the furnace; the temperature of the sample is lower by about 50° to 100°C.

The performance of the apparatus constructed as shown in FIG. 1 was tested against a standard (made by mixing HgI into carbon, and HgO into carbon and starch). In addition, various ignited materials containing no mercury were useful in the furnace to ascertain that $V_{out}$ remained zero in the absence of mercury in spite of smoke, steam, etc. Also, a standard determined $k_1$ and $k_2$ and the instrument was calibrated against the standards, and tested for mercury on tuna supplied and analyzed by the National Canners Association (by standard chemical analysis) with good agreement with the standard. Varying amounts of tuna containing 0.49 ppm and 0.24 ppm of Hg were placed in the furnace and a plot was made of ng of Hg vs. area under the Hg absorption signal. All samples were within 12 percent of the average over the range from 5 to 35 ng. After these tests, mercury concentrations were measured in various materials such as wall paints, papers, and meats. FIG. 3 shows a typical signal $V_{out}$ along with $V_R$ and $V_S$.

This technique is not limited to the detection of mercury; and can be extended to almost every element in which the atomic absorption technique is applicable. The block diagram (FIG. 1) illustrates only schematically a preferred embodiment of this invention. In actual use it would be advantageous although not essential to employ an automatic heating furnace, a phase-sensitive detector to eliminate extraneous light interference, and a digital integrator as is understood in the art. No great effort was made to increase the capability of this instrument to the limit. With improved electronics it should be possible to reach $10^{-11}$ g/cc of Hg atom determination. This corresponds to about 1 ppb sensitivity for a 10-mg sample.

It has been found, however, that the contaminated sample to be heated to a vapor must be quickly heated to a temperature below the melting point of the heating element of the furnace used for the heating. For a stainless steel furnace that is used as the secondary of a transformer, this temperature is up to 1,090°C or above. The lower limit is above the decomposition temperature of the methyl mercury, which is above about 150°C. For purposes of sensitivity, it has been found that temperatures of 900°C are preferred. To this end these higher temperatures decrease the smoke. Also, the furnace may be increased in size to decrease the effects of smoke, but too large a furnace decreases the effect of smoke at the expense of sensitivity.

Figure 4:
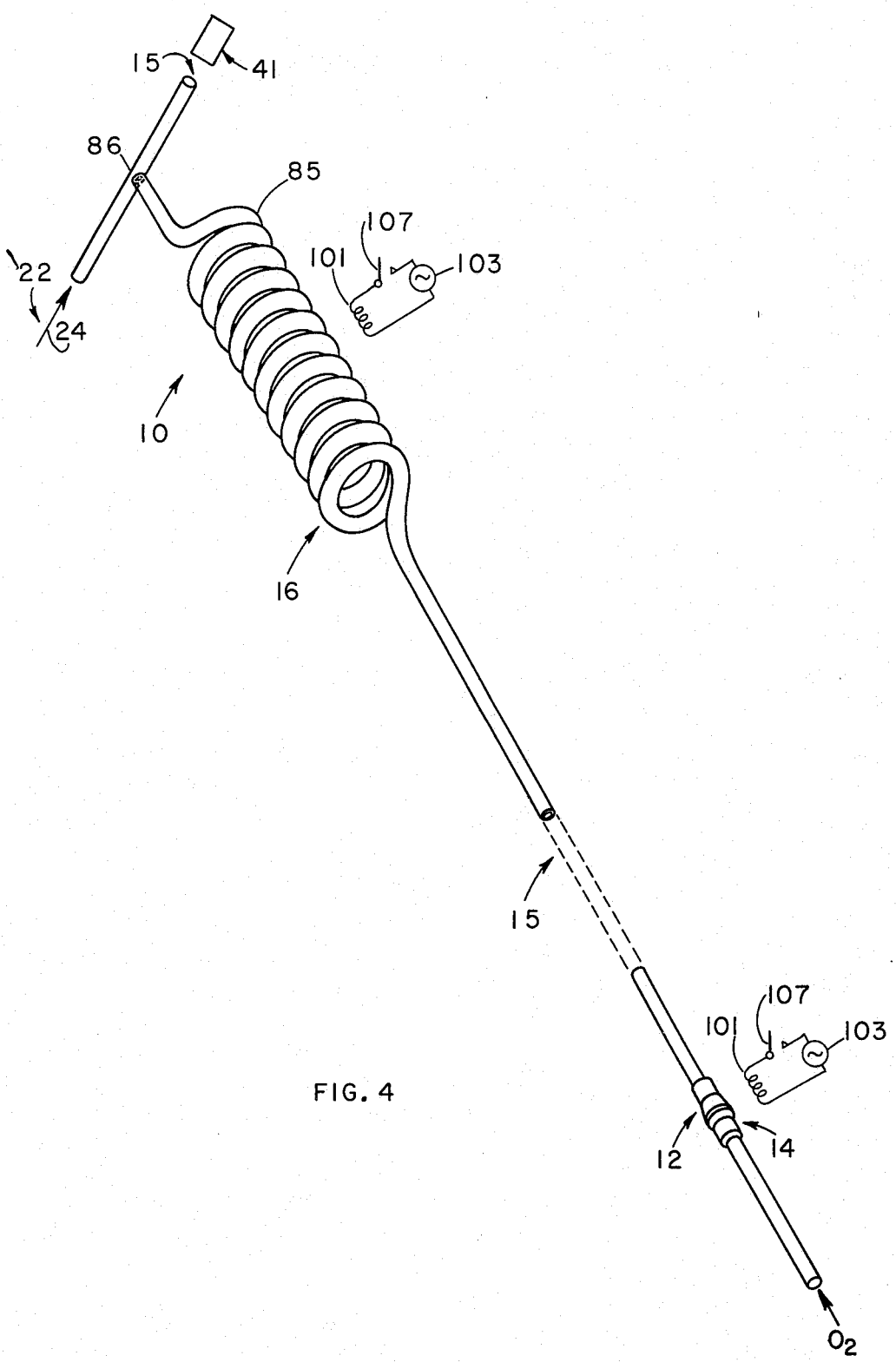
FIG. 4 is a partial three dimensional view of one embodiment of a suitable furnace in which mercury or another element containing a host substance, such as food, is vaporized for use in the apparatus of FIG. 1.

FIG. 4 shows details of one furnace 16. Advantageously, in operation the sample holder detaches for insertion and then operation, and a flow of vapor 15 works its way through the hollow, annular, heated helical, stainless steel coil 85. To this end a suitable heating element surrounds the helical coil 85, or a current is forced through a helical coil 85. Samples are forced out by forcing $O_2$, as well as inert gas, through the helix. Thereupon, the vaporized sample flows into the tube 86 that receives and transmits the focused light from lamp 25, e.g., from the source 80 therein, through the vapor 15 for the operation of the described Zeeman effect, whereby the Hg in sample 12 is detected and its level is determined from the readings from the described detector 41. It is advantageous to use a suitable stainless steel container for the furnace as a secondary of a transformer. This avoids the burnout of conventional nichrome heating elements in raising the temperature of the sample to 900°C or above. To this end, a coil 101 having a suitable A.C. source 103, induces a rapidly increasing current in the stainless steel coil 85 forming the furnace 16 for rapidly raising the sample temperature to 900°C or above when switch 107 closes.

While the above has described a Hg absorption method and apparatus for determination of down to 1 ppb of Hg in food or other substances in a very short time without complicated or expensive chemical separation of the Hg prior to the use of the Hg absorption spectrometer system of this invention, it will be understood from the above, that by changing the light source, the described system can be used for detecting a variety of other elements for similar or other applications. For example, the described system can be applied to the detection and determination of small amounts of arsenic, Pb or Cd in food or other substances.

For ease of explanation, the useful terms are defined in the following Table I:

TABLE I

| | |
|---|---|
| $^2P_1$ | First excited state of mercury |
| $^1S_0$ | Ground state of mercury |
| $\sigma^+$ | Group of Zeeman components lying outside the absorption profile in higher frequency scale. Conventional notation for $\sigma^+$ is right circularly polarized light. |
| $\pi$ | Linearly polarized light |
| $\sigma^-$ | Group of Zeeman components lying outside the absorption profile on the other side of $\sigma^+$. The conventional notation of $\sigma^-$ is left circularly polarized light. |
| kG | Kilogauss |
| ppm | Parts per million |
| ppb | Parts per billion |
| $\nu$ | Optical frequency |
| $\nu_0$ | Optical frequency in H = 0 |
| $\delta$ | Shift in Optical Freq. due to Zeeman effect |
| $g_J$ | Londe g-valve |
| H | Magnetic field |
| $\lambda$ | Wavelength |
| $m_F$ | Magnetic quantum members |
| F | Total angular momentum |

This invention has the advantage of providing a reliable, accurate, fast, and simple system for determining the levels of Hg (or other elements) in food and/or other substances without requiring any separate chemical separation prior to the use of the system of this invention. Actual tests have successfully detected ppb (parts per billion) of Hg in various substances. In this regard, the described specific mercury isotope source selectively provides specific shifted spectral lines due to hyperfine structure in the case of $^{199}$Hg. However, isotope shift can alternately be used in the case of the use of other isotopes, such as $^{198}$Hg.

Even in the absence of a magnetic field, one can provide a shifted line from the absorption peak of Hg in the atmosphere. However, by using the described magnetic field, this invention brings a group of shifted Zeeman components in coincidence with the top of the absorption peak and the remaining group away from the absorption peak to monitor the foreign particles or molecules that either absorb or scatter the resonance radiation resulting in the erroneous measurement of the amount of Hg present in the case of $^{199}$Hg hyperfine structure Zeeman effect. In the case of the use of $^{198}$Hg even isotope, this invention provides only two Zeeman components when taking the light therefrom along a magnetic field. In this example, the right and/or the left circularly polarized component can be brought to the coincidence with the Hg absorption profile while the other component monitors the foreign particles or molecules.

In review of the above, therefore, this invention has the advantage of using the hyperfine structure and/or isotope shift to set the center of the resonance line away from the absorption peak, and using the Zeeman effect to get a group of Zeeman lines or single circularly polarized component to be on top of the Hg absorption profile, and to use the remaining group of Zeeman components or other circularly polarized component to monitor the foreign host matter. Moreover, this invention has the advantage that only one light source need be used, and the Zeeman component is sharp so that light fluctuation of all the components of the lines are identical; also these components are sharp. Therefore, the detection error, due to temperature fluctuation of the described lamp, is negligible in accordance with this invention.

What is claimed is:

1. The method of detecting the presence of mercury in a host food material, such as fish, comprising the steps of:
   a. vaporizing a sample of the fish in an open-ended furnace at at least 150°C after having circulated a gas therethrough to decrease smoke;
   b. producing specific focused light spectra from a single specific $^{199}$Hg isotope in a single separate electrodeless light source means in the presence of a magnetic field of up to 10 kG whose direction is normal to the spectra and whose strength is sufficiently strong so that said spectra comprise ultra violet light having a wavelength of 2,537 A and specific $\sigma^+$, $\sigma^-$ and $\pi$ circularly and linearly polarized Zeeman components, a first of said components having an intensity that is capable of being attenuated by absorption by said mercury in said vapor, said first of said Zeeman components being on the top of the absorption peak profile of the mercury and the remaining of said Zeeman components being non-absorbed by said mercury in said vapor thereby forming at least one reference signal;

c. transmitting said light spectra through said vapor in said open-ended furnace wherein the aforesaid first component is attenuated and the other components are substantially non-absorbed by said mercury;

d. splitting said spectra emerging from said vapor into first and second beams;

e. producing a first electrical signal output corresponding to the intensity of said first beam;

f. subjecting said second beam to absorption by a filter that removes the aforesaid first component attenuated by the mercury in the vapor;

g. producing a second electrical signal output corresponding to the intensity of the filtered second beam; and h. measuring the difference between the first and second electrical signal outputs as an indication of the amount of mercury present in said sample of said fish.

2. The method of claim 1, wherein said vaporizing step is in a helix-shaped furnace at 900°C having a selective flow of $O_2$ and N therethrough to decrease smoke therein.

3. The method of claim 1, wherein said vaporizing is in a stainless steel furnace formed as the secondary of a transformer for rapidly heating the furnace temperature to at least 900°C.

4. The method of claim 1 in which said vapor is heated to at least 800°C during the time in which said measuring step takes place.

5. The method of claim 1 in which said step of producing said specific focused light spectra in the presence of said magnetic field comprises producing said spectra in a dipole magnet having north and south poles spaced apart by about 11 mm for transmitting the desired spectra at right angles to the field, and transmitting said spectra through a 2.5 mm diameter aperture.

6. The method of claim 1 in which the $\pi$ component is attenuated by said mercury by being on top of the absorption peak profile of said mercury, and said $\sigma^+$ and $\sigma^-$ components are nonabsorbed components on either side of the $\pi$ component.

7. The method of claim 1 in which said electrical output signals are produced by photomultipliers that are balanced to produce equal outputs when there is no vapor present in said furnace.

8. The method of claim 1 in which one-half of the split spectra is passed through a natural mercury vapor cell at 25°C filled with argon at one atmosphere to remove the $\pi$ component.

9. The method of claim 1 in which said spectra comprise at least two Zeeman components that are separated with a gain of 12 GH$_z$ in Zeeman separation over the normal Zeeman effect for avoiding the pressure broadened profile of natural mercury in said magnetic field overlapping these two hyperfine levels in a zero magnetic field.

10. The method of claim 1 in which said sample is inserted in said furnace, is vaporized and works its way through a hollow, annular, heated stainless steel coil acting as the secondary of a transformer up to 1,090°C before said spectra are transmitted through said vapor.

* * * * *